United States Patent
Ozaki

[19]

[11] Patent Number: 6,109,707
[45] Date of Patent: *Aug. 29, 2000

[54] STORAGE CASE FOR RECORDING MEDIA

[75] Inventor: Hiroshi Ozaki, Miyagi, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/038,289

[22] Filed: Mar. 11, 1998

[30] Foreign Application Priority Data

Mar. 25, 1997 [JP] Japan .................................. 9-071409

[51] Int. Cl.$^7$ ................................................... F16B 12/00
[52] U.S. Cl. ............................................ 312/111; 312/107
[58] Field of Search ................................ 312/107, 108, 312/111, 198; 403/381, 292, 294

[56] References Cited

U.S. PATENT DOCUMENTS

| | | | |
|---|---|---|---|
| 3,552,817 | 1/1971 | Marcolongo | 312/107 |
| 3,904,259 | 9/1975 | Hoffmann et al. | 312/111 |
| 3,974,898 | 8/1976 | Tullis et al. | 312/111 X |
| 4,269,461 | 5/1981 | Roach, Jr. | 312/111 X |
| 4,285,559 | 8/1981 | Koch | 312/111 X |
| 4,410,093 | 10/1983 | Chiariello et al. | 403/292 X |
| 4,436,355 | 3/1984 | Fortune | 312/111 X |
| 4,570,793 | 2/1986 | O'Neil et al. | 312/111 X |
| 4,577,914 | 3/1986 | Stravitz | 312/111 X |
| 4,728,158 | 3/1988 | D'Elia et al. | 312/108 |
| 4,900,090 | 2/1990 | Davis | 403/381 X |
| 5,666,713 | 9/1997 | Kubota | 312/111 X |

FOREIGN PATENT DOCUMENTS

| | | | |
|---|---|---|---|
| 1214595 | 4/1960 | France | 312/111 |
| 1544144 | 10/1968 | France | 312/111 |

Primary Examiner—Peter M. Cuomo
Assistant Examiner—Hanh V. Tran
Attorney, Agent, or Firm—Ronald P. Kananen; Rader, Fishman & Grauer

[57] ABSTRACT

A storage case including a boxlike outer body section and an inner storage section that is slid into the outer body section. The storage case further includes a slidable joint member supported by an engaging section supported by the bottom of the outer body section, wherein adjacent cases can be easily joined by sliding out the joint member of one of the storage cases and inserting nad engaging the joint member with the engaging section of the other case.

13 Claims, 10 Drawing Sheets

STORAGE CASE FOR RECORDING MEDIA

BACKGROUND OF THE INVENTION

1. Field of the Invention

The present invention relates to a storage case capable of collectively holding and storing as a library a plurality of recording media, such as recording and replay cassette tapes and CDs, each held in a protective case or a decorative case, and of allowing any of the recording media to be taken out as needed.

2. Description of the Related Art

Figure 18:
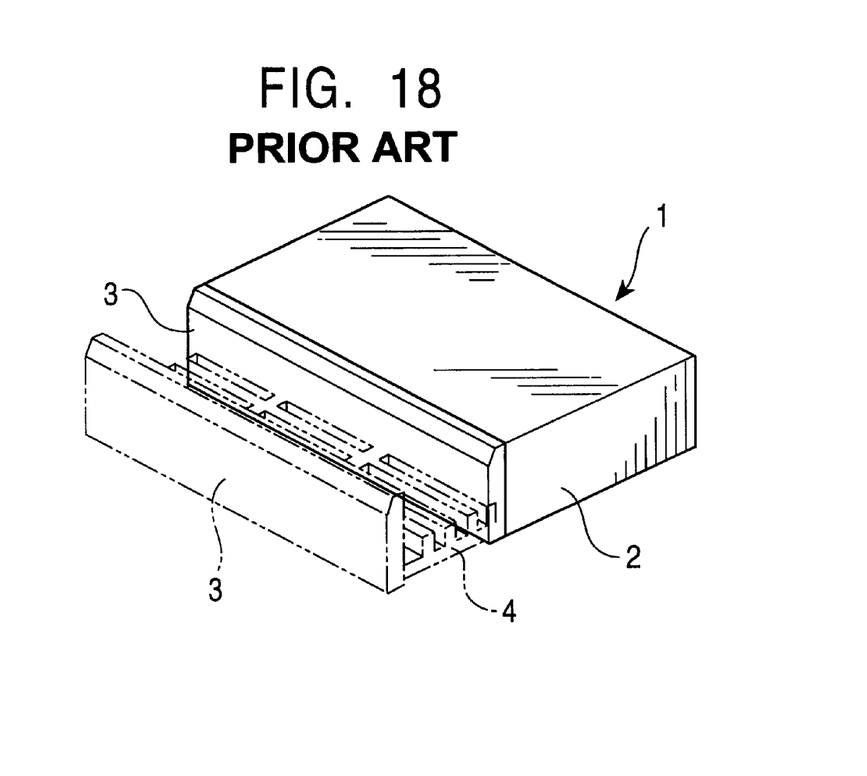
FIG. 18 is a perspective view of a conventional storage case.

A popular type of storage case has the structure, for example, shown in FIG. 18. The storage case 1 shown in FIG. 18 is composed of an outer body section 2, and an inner storage section 3 that is drawn into and out of the outer body section 2. The inner storage section 3 is provided with partitions 4 arranged in three rows so that, for example, thirty cassette tapes, each housed in a decorative case, can be orderly arranged and stored. Both the outer body section 2 and the inner storage section 3 are molded from PS plastic such as ABS or HIPS.

Such a large storage case that accommodates many cassette tapes is unexpectedly expensive and requires a wide space for placement. Therefore, the storage case is suited to store many cassette tapes at a time, while it is disadvantageous in cost and space when the number of cassette tapes to be stored gradually increases.

Figure 19:
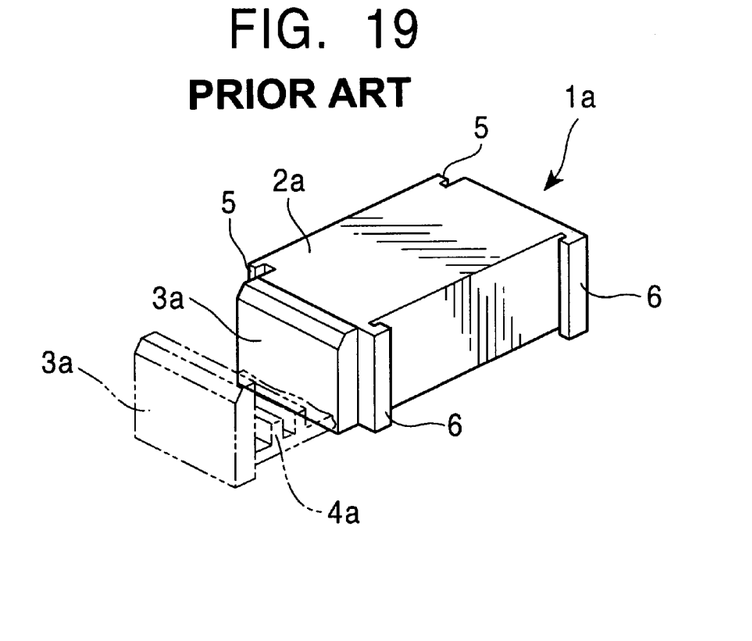
FIG. 19 is a perspective view of a possible storage case capable of being joined to another one.
Figure 20:
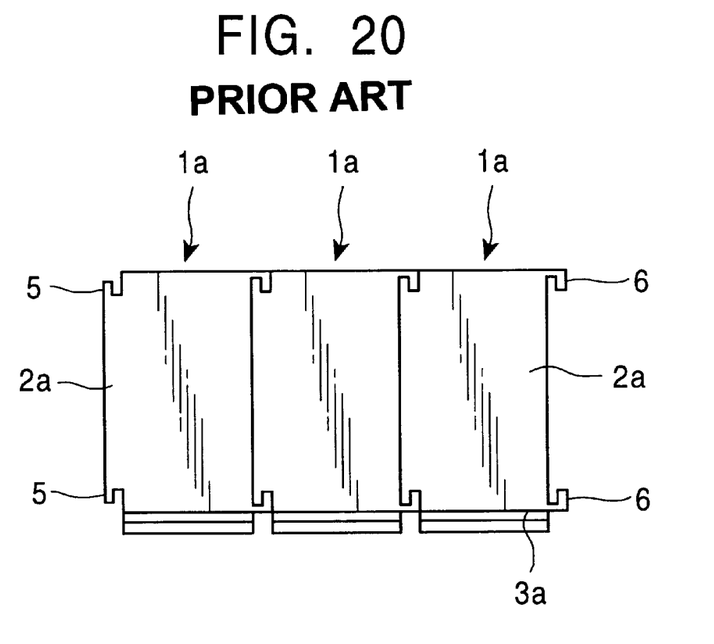
FIG. 20 is a plan view of joined storage cases of the type shown in FIG. 19.

Accordingly, in order that an additional storage case can be sequentially joined every time the number of cassette tapes to be stored increases by a fixed number, there is a proposal of a compact storage case 1a that accommodates, for example, ten cassette tapes, as shown in FIGS. 19 and 20. The compact storage case 1a is made of a similar material to that of the aforesaid prior art, composed of an outer body section 2a and an inner storage section 3a, and provided with a row of partitions 4a formed inside the inner storage section 3a.

The outer body section 2a has a flange-shaped or vertically grooved joint section 5 formed on one side thereof, and a hooked joint section 6 formed on the other side so that the storage case 1a can be joined to another one. In joining two storage cases, the hooked joint section 6 of one of the storage cases is engaged with and slid along the flange-shaped or grooved joint section 5 of the other storage case.

Although such storage cases can be sequentially joined through the joint sections 5 and 6 on both sides of the outer body section 2a of each storage case, since the joint sections 5 and 6 are projecting outward from both sides, the outside dimensions of the storage case 1a are increased, and a wider space for placement is thereby required. Furthermore, since the joint sections are projecting, the outward appearance is impaired, and another object, the hand or the like is sometimes damaged by being caught by or contacted with the projecting joint sections.

SUMMARY OF THE INVENTION

In view of the above problems of the prior art and the proposal, it is an object of the present invention to provide a storage case that responds to a gradual increase in the number of cassette tapes to be stored without increasing the outside dimensions thereof, and that adds to the outward appearance by inhibiting a joint section from projecting outward when joining is not required.

In order to achieve the above object, according to the main aspect of the present invention, there is a storage case for accommodating a plurality of encased recording media, the storage case including a boxlike outer body section, and an inner storage section capable of sliding into and out of the outer body section, wherein the outer body section has a retractable joint means and an engaging means to be engaged with the joint means at the bottom thereof.

In the storage case of the present invention, the engaging means may include a leg section and a protruding section formed at the bottom of the outer body section with which the joint means is slidably engaged. The joint means may be formed of a flat plate member having a window and may be provided with a recessed section for guiding the joint means passing over either the leg section or the protruding section in the engaging means. The inner storage section may be provided with a space for storing the joint means.

While the storage case of the present invention can, of course, be singly used, a plurality of storage cases can be arbitrarily joined as needed without any constraints to placement because each storage case has a joint means.

Furthermore, since the joint means is hidden on the base of the outer body section, the entire appearance of the storage case is good. Moreover, since the storage case has no lateral projections, it is prevented from being hit or caught by other objects, the hand, or the like.

DESCRIPTION OF THE PREFERRED EMBODIMENTS

Preferred embodiments of the present invention will now be described with reference to the attached drawings.

FIGS. 1 to 6 show a storage case 11 according to a first embodiment of the present invention. The storage case 11 accommodates in a row many recording media, such as recording and replay cassette tapes, each housed in a protective case or a decorative case, and it is shaped like a rectangular box.

Figure 1:
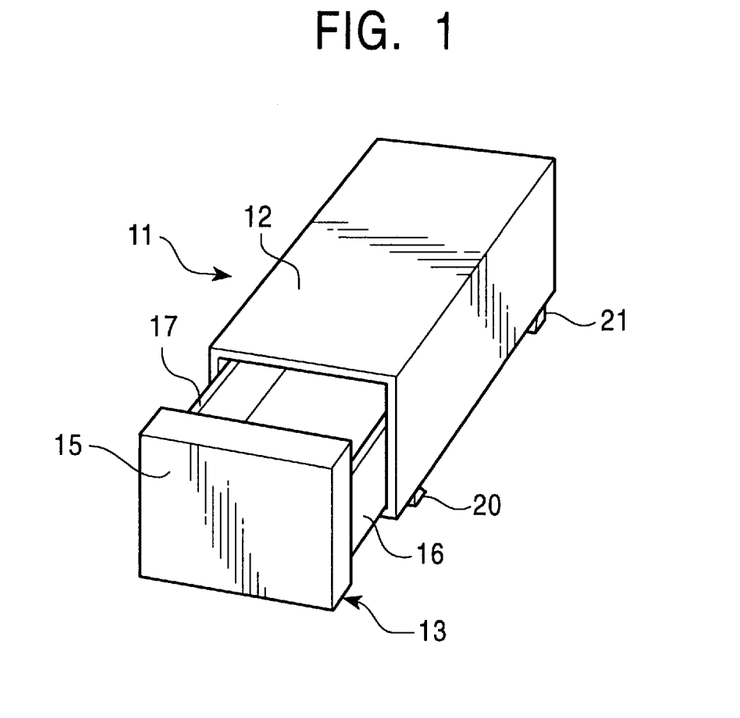
FIG. 1 is a perspective view of a storage case according to a first embodiment of the present invention.
Figure 2:
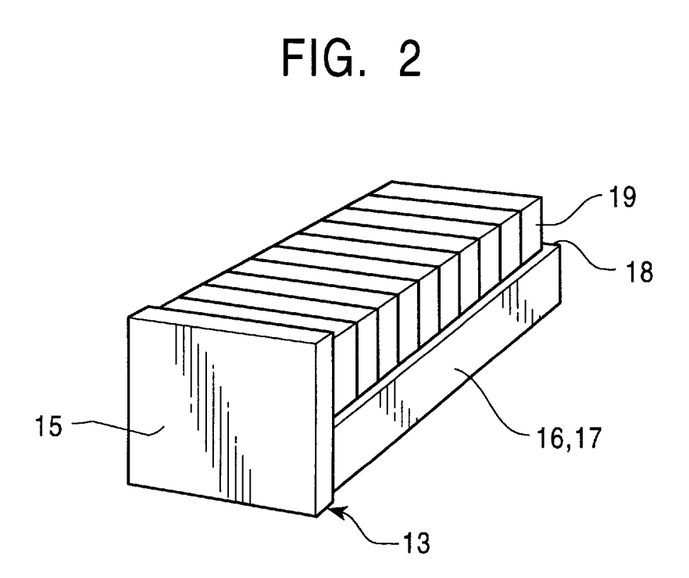
FIG. 2 is a perspective view of an inner storage section of the storage case.

The storage case 11 is composed of an outer body section 12, an inner storage section 13 to be drawn into and out of the outer body section 12, and a joint member 14 located at the bottom of the outer body section 12 for constituting a slide-out joint means. These components are molded from plastic.

Figure 12:
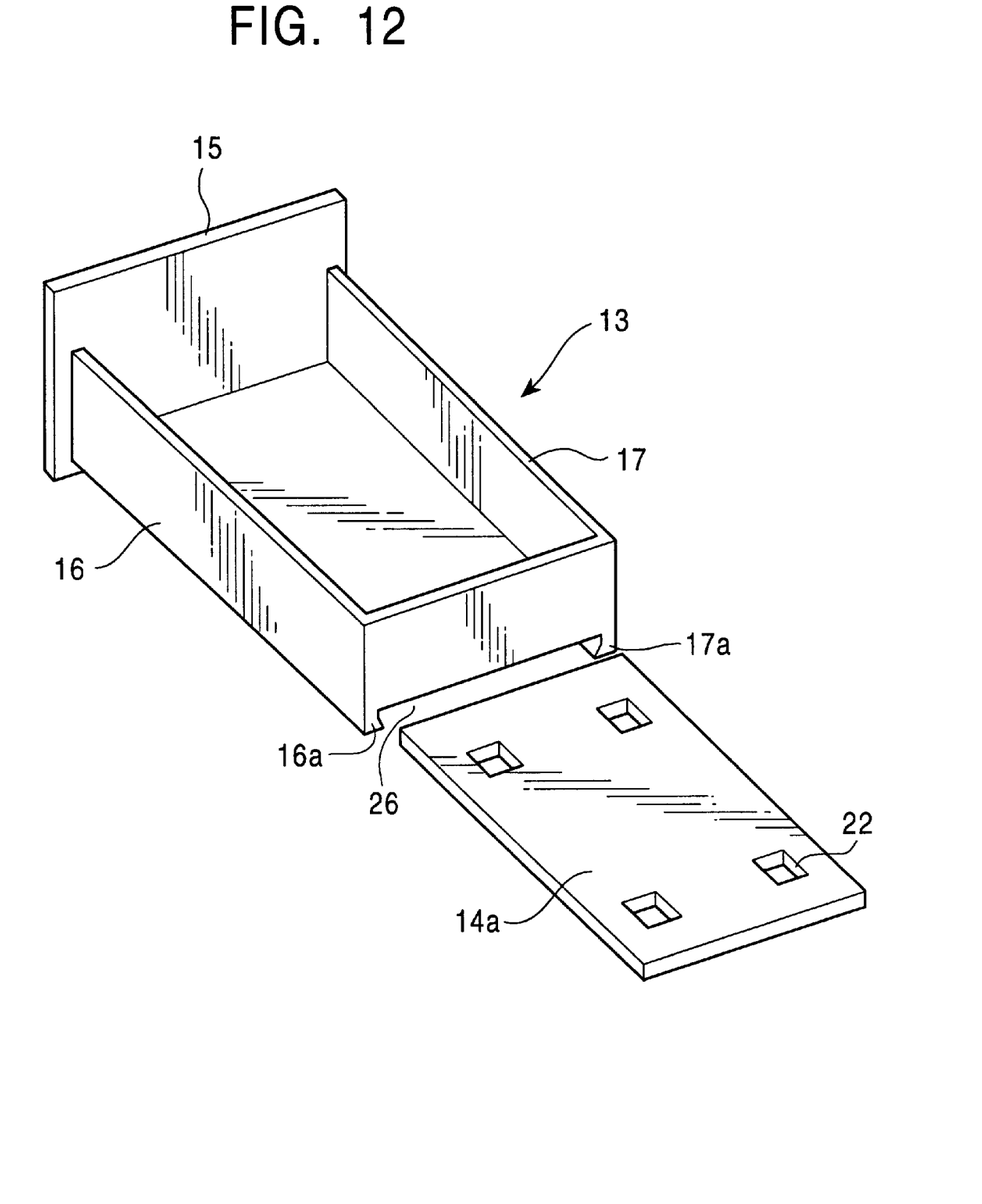
FIG. 12 is a perspective view showing a further state in which the joint member is to be housed.

The inner storage section 13 includes, as shown in FIG. 12, four parts that are integrally formed, that is, a front panel 15, side walls 16 and 17 of a fixed height that are connected to the front panel 15, and a back wall 18 connected to the side walls 16 and 17, whereby the entire inner storage section 13 is formed in the shape of a box.

The front panel 15 is formed in such a size that it covers the entire front side of the outer body section 12, and a handle (not shown) may be appropriately formed or attached thereon. While the side walls 16 and 17 and the back wall 18 may be formed in almost the same height as that of the inner space section inside the outer body section 12, they are not required to have such a height, but are required to be at least about half as high as the inner space section in consideration of cost efficiency of materials to be used and ease of taking in and out stored contents.

For example, recording and reproduction cassette tapes each held in a decorative or protective case, what is called, encased tapes (recording media) 19 are housed adjacent to one another inside the space enclosed by the front panel 15, the side walls 16 and 17, and the back wall 18. In order that the encased recording media 19 are aligned at close intervals (about 2 mm to 5 mm) to be easily taken in and out, partitions having a fixed thickness may be provided at housing positions of the encased recording media 19. In this embodiment, for example, ten encased recording media 19 are housed in parallel.

Figure 3:
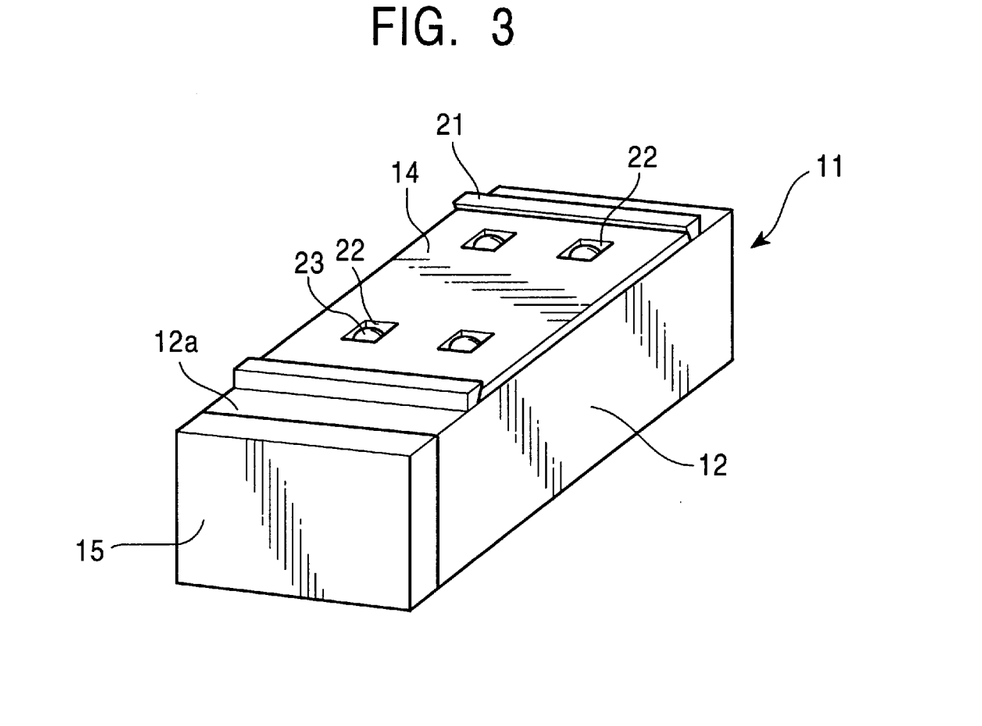
FIG. 3 is a rear perspective view of the storage case.
Figure 4:
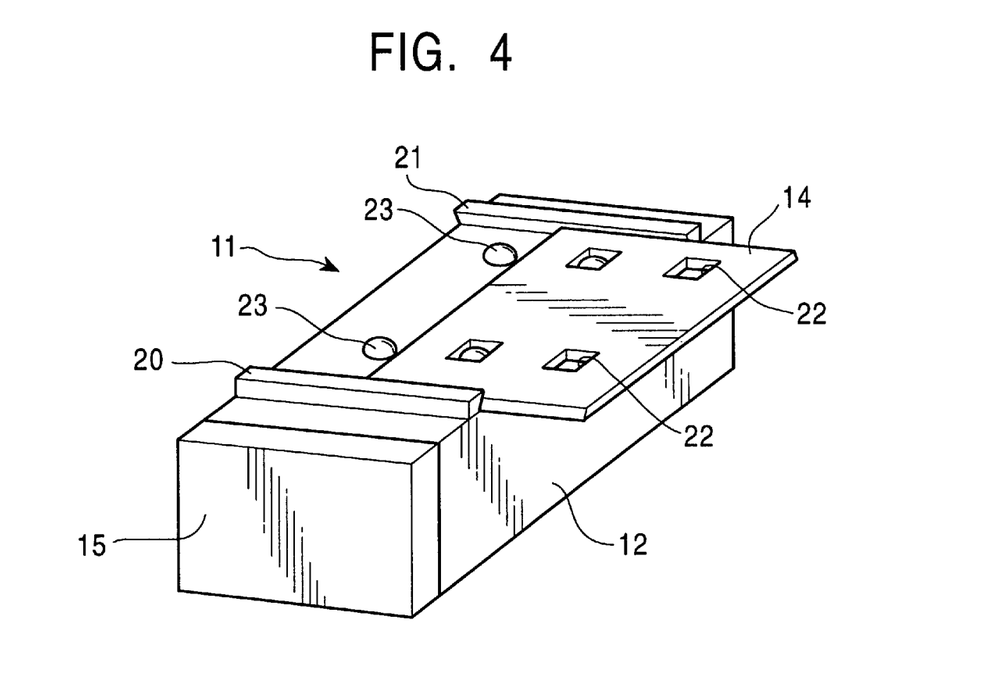
FIG. 4 is a rear perspective view of the storage case from which a joint member is slid out.

The outer body section 12 is shaped like a rectangular box that is open at the front side, and the joint member 14 serving as the joint means is located on a bottom section 12a of the body section 12, as shown in FIGS. 3 and 4. The joint member 14 is shaped like a rectangular plate of fixed width and length, and located so that it can slide in and out laterally between leg sections 20 and 21 formed as engaging means on the bottom section 12a.

The joint member 14 has almost the same area as that of the bottom section 12a between the leg sections 20 and 21, and provided with a plurality of (four in the shown embodiment) windows 22 formed at fixed positions in a required arrangement. The windows 22 serve as a kind of retaining means, and are formed, for example, adjacent to four corners of the joint member 14, or formed at fixed intervals along both sides of the joint member 14 that are not engaged with the leg sections 20 and 21.

The bottom section 12a of the outer body section 12 is provided with a plurality of protrusions 23 that serve as joined or engaging means to be engaged with or fitted in the windows 22. These protrusions 23 protrude at a height of at most 0.5 mm to 2 mm in the form of an arc. When the joint member 14 is slid, it runs onto the protrusions 23, and the windows 22 thereof are fitted on the protrusions 23, whereby the storage or joint position thereof is fixed.

Accordingly, when the storage case 11 is used singly, the protrusions 23 are engaged with or fitted in the corresponding windows 22 on the bottom section 12a of the storage case 11, and the joint member 14 serving as the joint means is placed at the bottom of the single storage case 11. Since the joint member 14 can hardly be noticed from outside during use, the storage case 11 looks neat on the outside.

Figure 5:
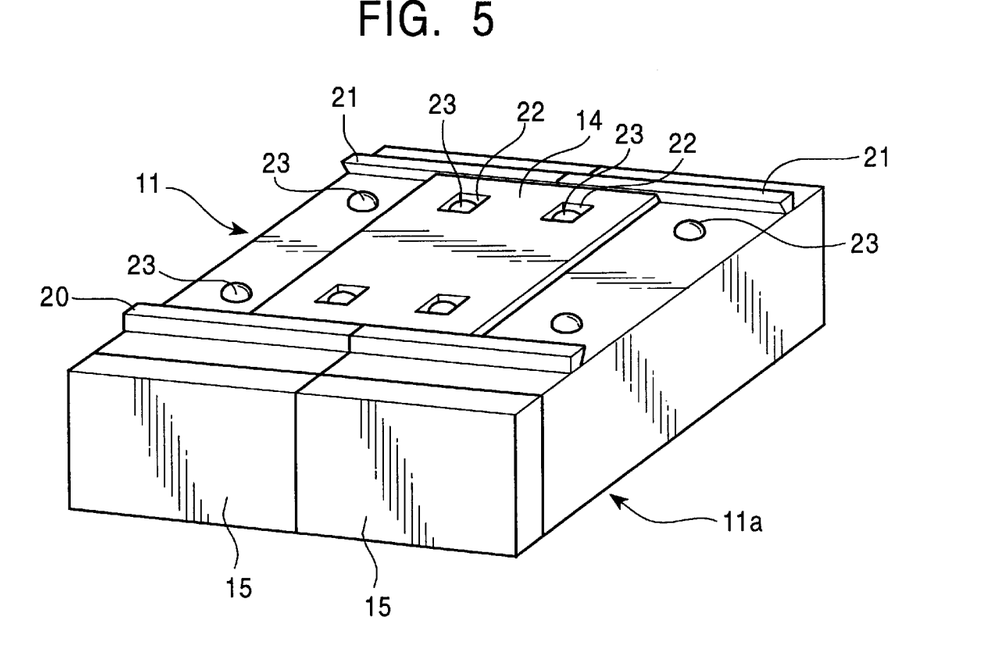
FIG. 5 is a rear perspective view of two storage cases joined to each other.

When two storage cases 11 and 11a are joined to each other, as shown in FIGS. 4 and 5, the joint member 14 of one of the storage cases 11 is first drawn out and projected toward the other storage case 11a to be joined. In this case, when the joint member 14 is drawn out by half the width thereof, the windows 22 at the rear end of the drawn joint member 14 are engaged with or fitted on the protrusions 23 located on the drawing side, which stabilizes the drawn or projected state of the joint member 14.

The other storage case 11a to be joined requires no joint member 14 serving as the joint means, and therefore, the joint member 14 is slid out of the bottom section thereof. The removed joint member 14 is stored in an appropriate place out of the way. When the storage cases 11 and 11a are joined, the joint member 14 of either of them is removed.

The other storage case 11a, from which the joint member has been removed, is placed adjacent to the storage case 11, and the free end of the joint member 14 drawn from the storage case 11 is forcibly inserted between the leg sections 20 and 21 of the other storage case 11a, whereby the joint member 14 is placed on both the storage cases 11 and 11a, as shown in FIG. 5, and the windows 22 on the inserted end side are engaged with or fitted on the protrusions 23 of the other storage case 11a. As a result, the storage cases 11 and 11a are stably joined to each other via the joint member 14.

Figure 6:
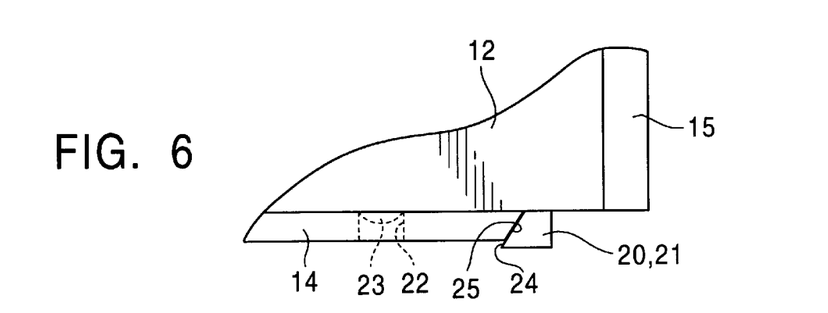
FIG. 6 is a side view showing the principal part of an engaging section of the joint member in the storage case.

The leg sections 20 and 21 formed on the bottom section 12a of the outer body section 12 support the joint member 14, serve as engaging means for use in joining, and guide the joint member 14. As shown in FIG. 6, the inner sides of the opposing leg sections 20 and 21 are formed as engaging sections 24 tapered toward the bases thereof. The ends of the joint member 14 are formed as wedge end sections 25 corresponding to the tapered engaging sections 24. The engagement between the engaging sections 24 and the wedge end sections 25 prevents the joint member 14 from falling off and allows the joint member 14 to slide.

Figure 7:
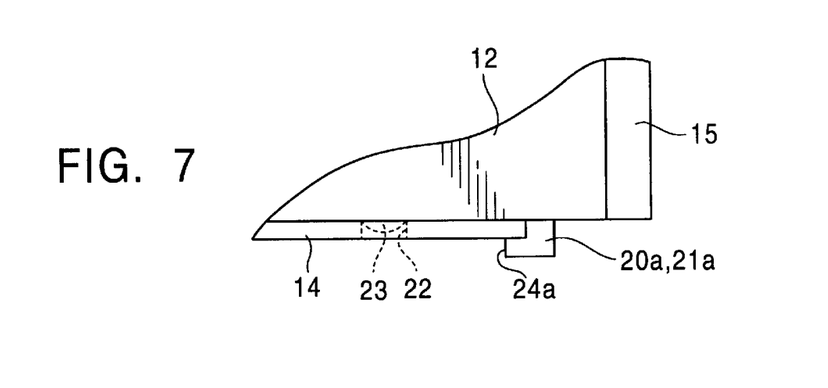
FIG. 7 is a side view showing the principal part of another form of the engaging section of the joint member in the storage case.

Another form of the leg sections is shown in FIG. 7. In this case, the opposing inner sides of leg sections 20a and 21a are provided with projections that form hooked engaging sections 24a. These hooked engaging sections 24a allow the engagement and slide of the joint member 14 without changing the form of the ends thereof.

Figure 8:
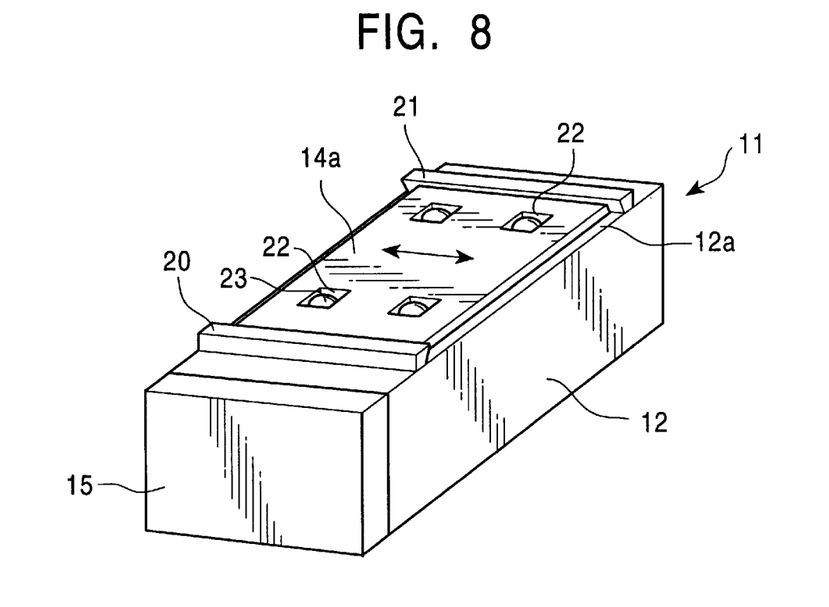
FIG. 8 is a rear perspective view of a storage case according to a second embodiment of the present invention.
Figure 9:
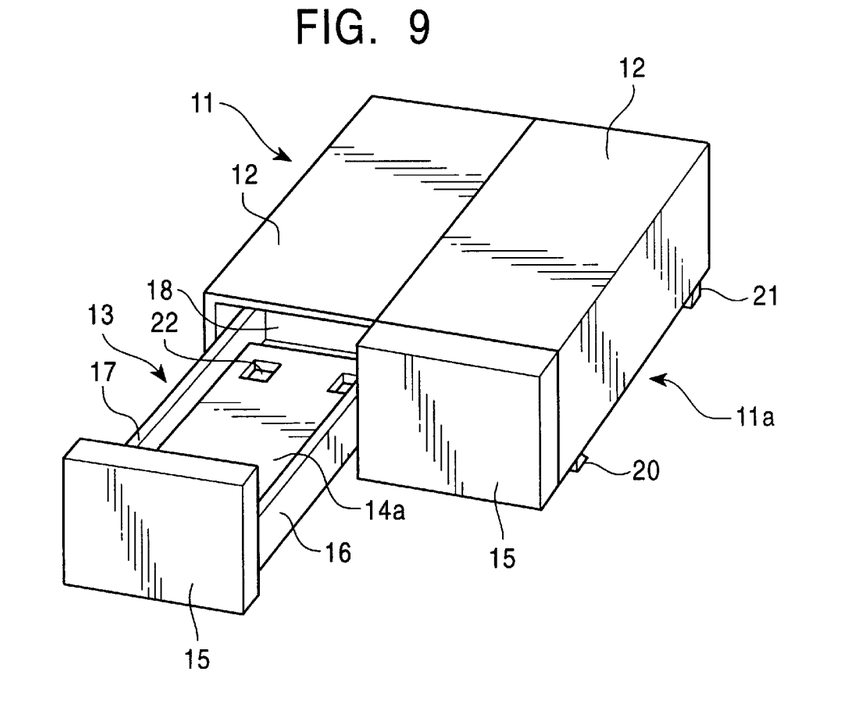
FIG. 9 is a perspective view showing a state in which two storage cases of the second embodiment are joined and a joint member is housed therein.

FIGS. 8 and 9 show a storage case according to a second embodiment of the present invention. In the second embodiment, one of the joint members, which is unnecessary in joining a plurality of storage cases, can be stored inside one of the storage cases. For this purpose, the size (width) of the joint member is reduced, and a space for storing the joint member therein is formed in an inner storage section 13 of the storage case. Since other components are substantially the same as those of the first embodiment, they are denoted by the same numerals, and a detailed description thereof is omitted.

A joint member 14a of the second embodiment is the same as the joint member 14 of the first embodiment in that it is placed slidably in the lateral direction between leg sections 20 and 21 formed on a bottom section 12a of an outer body section 12, and is slightly different in that the width thereof is reduced. That is, the width of the joint member 14a is smaller than that of the bottom section 12a of the outer body section 12, and is smaller than the space between side walls 16 and 17 of the inner storage section 13. In this case, both side ends of the joint member 14a are simply cut off without changing the positions of windows 22, and therefore, protrusions 23 may be formed at the same positions on the bottom section 12a as those in the first embodiment.

When the storage case 11 is used singly, the joint member 14a remains supported on the bottom section 12a of the outer body section 12 similarly to the first embodiment. Since the joint member 14a is not noticed from outside, the storage case 11 can have a good appearance. Furthermore, when two storage cases 11 and 11a are joined to each other, the joint member 14a removed out of one of the storage cases 11 and 11a can be stored inside the inner storage section 13, as shown in FIG. 9.

In such a storage case 11 with the joint member 14a stored therein, although the entire storage space is raised, some extra space is left above the storage space, and therefore, the inner storage section 13 can be drawn into and out of the outer body section 12 without any trouble even if encased recording media 19 are put therein while somewhat projecting upward.

Figure 10:
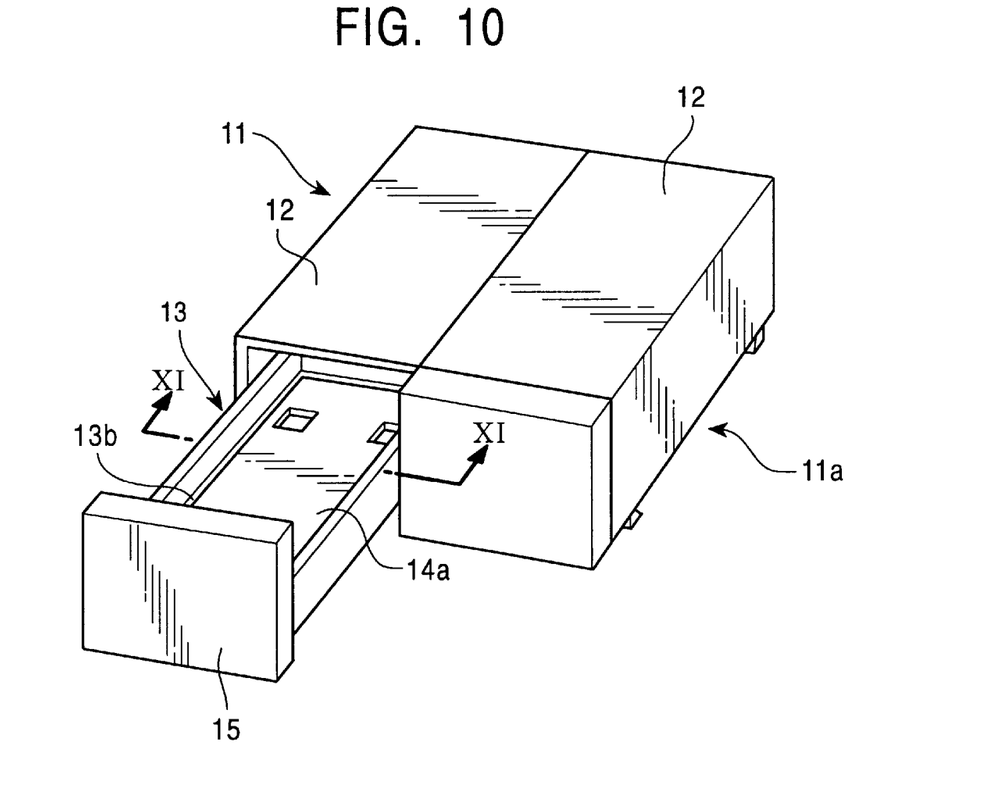
FIG. 10 is a perspective view showing another state in which the two storage cases of the second embodiment are joined and the joint member is housed therein.
Figure 11:
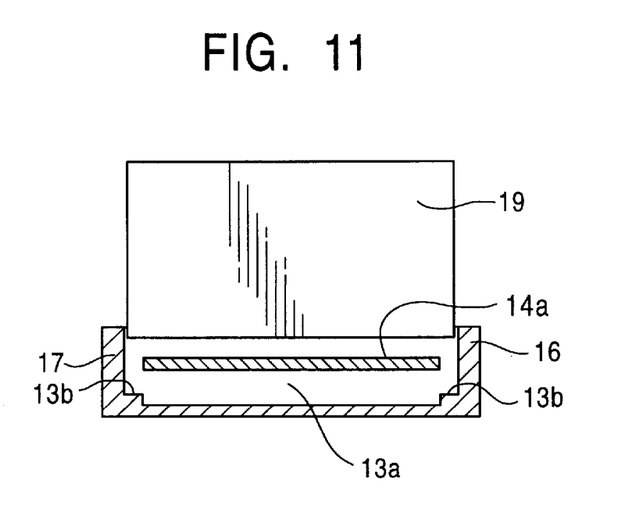
FIG. 11 is an enlarged sectional view taken along line XI—XI in FIG. 10.

Furthermore, as shown in FIGS. 10 and 11, a concave section 13a almost corresponding to the joint member 14a may be formed at the bottom of the inner storage section 13, and a flat section 13b of a fixed width may be formed on the periphery of the concave section 13a. In this case, the removed joint member 14a can be stored in the concave section 13a without having any affect on the storage of the encased recording media 19.

Even in the inner storage section 13 that is not required to store the joint member 14a therein, the encased recording media 19 are supported near both ends thereof by the flat section 13b formed around the concave section 13a, and can thereby be smoothly taken in and out without any trouble.

As another example, the joint member 14a may be stored in a required storage space that is formed at the inner bottom of the outer body section 12 or at the outer bottom of the inner storage section 13. In the latter case, as shown in FIG. 12, leg sections 16a and 17a are formed by slightly extending both the side walls 16 and 17 of the inner storage section 13 in the downward direction so that a storage space 26 is formed between the leg sections 16a and 17a.

Since the storage space 26 is formed by extending the side walls 16 and 17, the width thereof almost corresponds to the width of the joint member 14a, and the height of the leg sections 16a and 17a is slightly more than the thickness of the joint member 14a. Moreover, the free ends, that is, the lower ends of the leg sections 16a and 17a are slightly bulged inward and shaped like a hook, and the joint member 14a is inserted into the storage space 26 from the rear side of the inner storage section 13 to be stored.

Such storage allows the joint member 14a to be appropriately friction-engaged with the inner storage section 13, and to be thereby stably stored without rattling. Furthermore, when the inner storage section 13 is put into the outer body section 12, the inner base of the outer body section 12 and the outer base of the inner storage section 13 do not rub together in full contact, and only the leg sections 16a and 17a make contact with the outer body section 12, which makes it possible to draw the inner storage section 13 in and out relatively easily.

A third embodiment of the present invention is shown in FIGS. 13 to 16. The third embodiment is different from the aforesaid first and second embodiments in that a plurality of storage cases are joined without removing a joint member from any of the storage cases. Since the components in the third embodiment are also the same as those in the first embodiment except that the width of the joint member is reduced, they are denoted by the same numerals, and a detailed description thereof is omitted.

Figure 13:
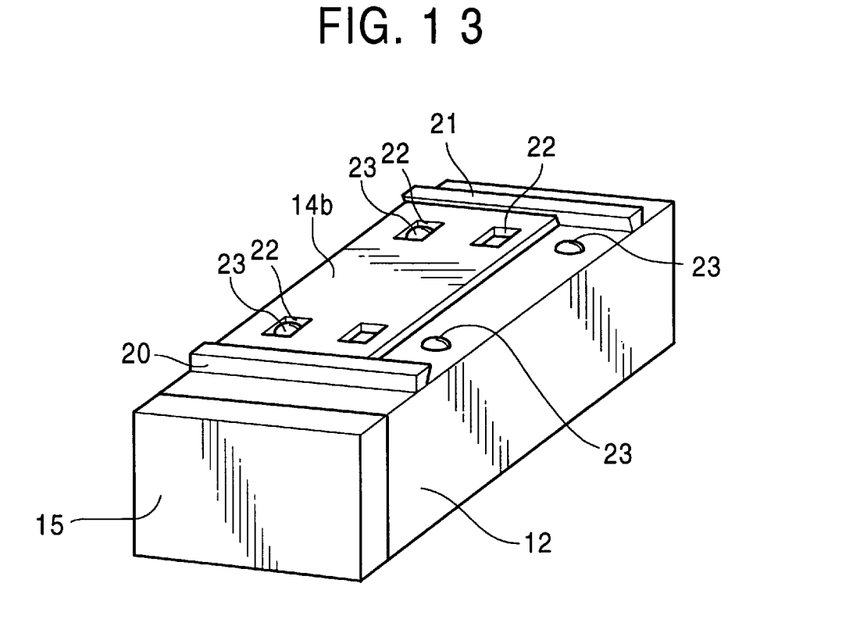
FIG. 13 is a rear perspective view of a storage case according to a third embodiment of the present invention.

A joint member 14b adopted in the third embodiment is formed about two-thirds as wide as a bottom section 12a of an outer body section 12. A plurality of windows 22 are formed near the long sides of the joint member 14b, and protrusions 23 are also formed offset toward the side walls on the bottom section 12a of the outer body section 12a. Leg sections 20 and 21, which constitute engaging means and also serve as guides, are formed in the same manner as in the first embodiment.

The joint member 14b thus formed is, as shown in FIG. 13, positioned offset toward one of the side walls on the bottom section 12a of the outer body section 12 so that the windows 22 on one side are engaged with or fitted on the protrusions 23 formed on the same side wall side. Therefore, the windows 22 on the other side are not engaged with or fitted on the protrusions 23 formed on the other side wall side, and about one-third of the bottom section 12a is not covered by the joint member 14b. Since the joint member 14b is positioned offset toward one of the side walls on the bottom section 12a and the windows 22 on the same side are engaged with or fitted on the protrusions 23, the joint member 14b is prevented from falling off and rattling, and is stably held.

Figure 14:
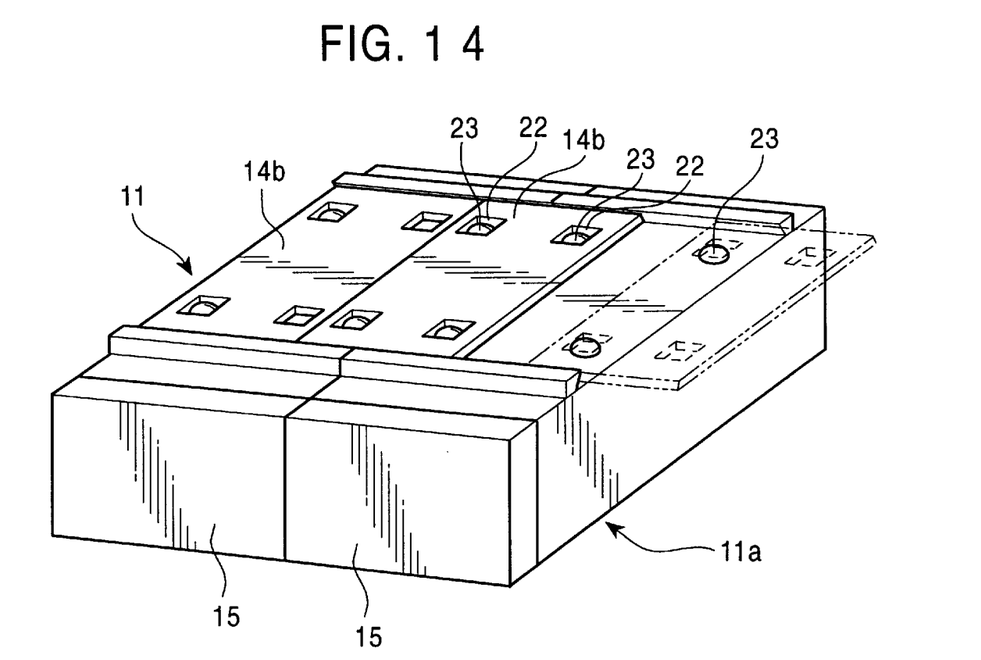
FIG. 14 is a rear perspective view of two storage cases joined to each other according to the third embodiment.
Figure 15:
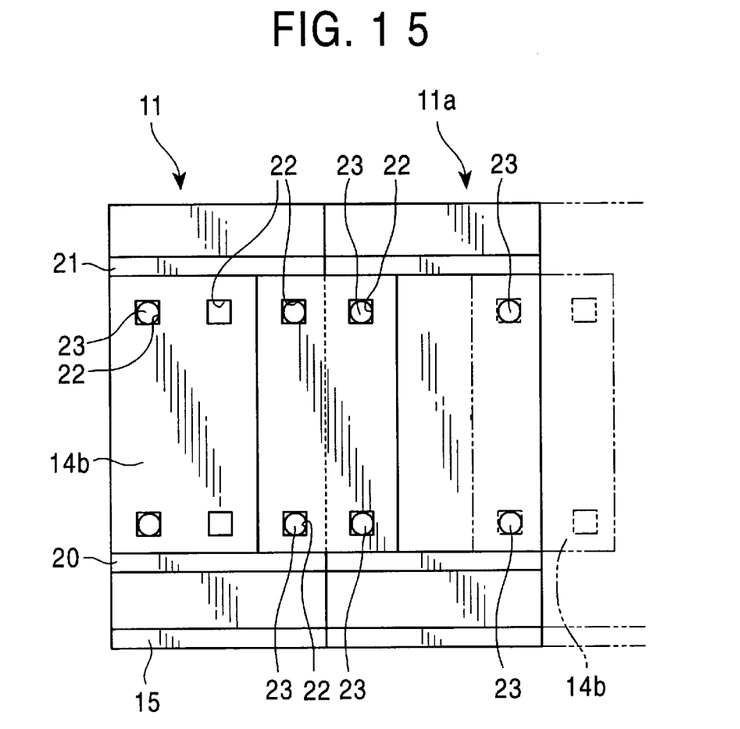
FIG. 15 is a rear plan view showing how to join a plurality of storage cases of the third embodiment.

When, for example, two storage cases 11 and 11a held in such a state are joined to each other, as shown in FIGS. 14 and 15, the joint member 14b of one of the storage cases 11 is left unchanged, and the joint member 14b of the other storage case 11a to be joined is slid out toward the joint side. When the windows 22 on the rear side of the slid joint member 14b are engaged with or fitted on the protrusions 23 on the joint side of the storage case 11, about half of the joint member 14b is projecting from the storage case 11a.

Since the total width of the joint member 14b is about two-thirds that of the bottom section 12a, the protruding half of the joint member 14b has a width equal to about one-third that of the bottom section 12a. In this state, the other storage case 11a is placed adjacent to the storage case 11, the projecting joint member 14b is inserted between the leg sections 20 and 21 from the side of the storage case 11, and the windows 22 on the projecting side of the joint member 14b are engaged with or fitted on the protrusions 23 on the other side wall side of the storage case 11, whereby the joint between the storage cases 11 and 11a is completed.

In this case, the joint member 14b of the storage case 11 and the joint member 14b of the other storage case 11a, which has contributed to the joining, are butted on the bottom section 12a, the joint member 14b that has contributed to the joining lies over the storage cases 11 and 11a, and the windows 22 thereof are respectively engaged with or fitted on the protrusions 23, which achieves a stable joint. In addition, since the other storage case 11a can be joined without removing the joint member 14b of the storage case 11, there is no need for a space for the joint member to be stored.

A further storage case can be easily joined in sequence by drawing out a joint member held therein by a required length, as shown by imaginary lines in FIG. 14 and 15.

Figure 16:
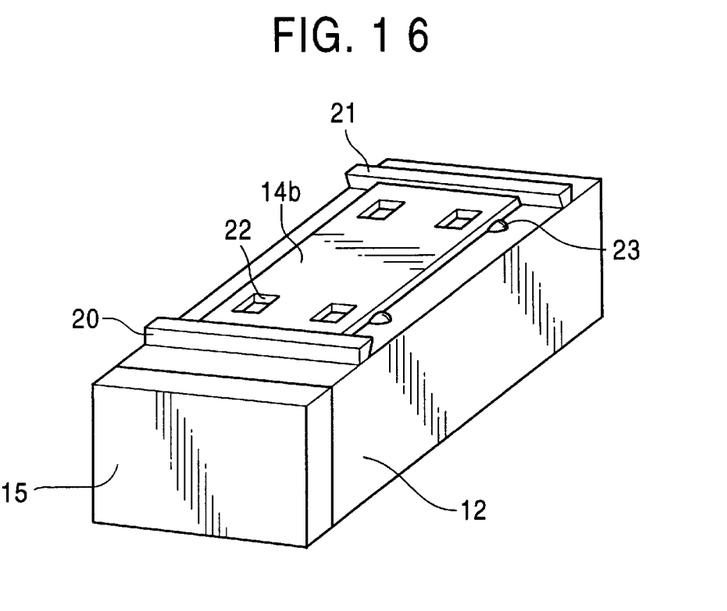
FIG. 16 is a rear perspective view showing another position of the joint member of the storage case according to the third embodiment.

In consideration of the total balance of a single storage case, it is probable that the joint member 14b will be required to be placed at the center of the bottom section 12a of the outer body section 12, as shown in FIG. 16. In such a case, both side ends of the joint member 14b are placed on the protrusions 23 and undue stress is applied to the joint member 14b and the engaging or guiding leg sections 20 and 21 because the width of the joint member 14b is about two-thirds that of the bottom section 12a.

Figure 17:
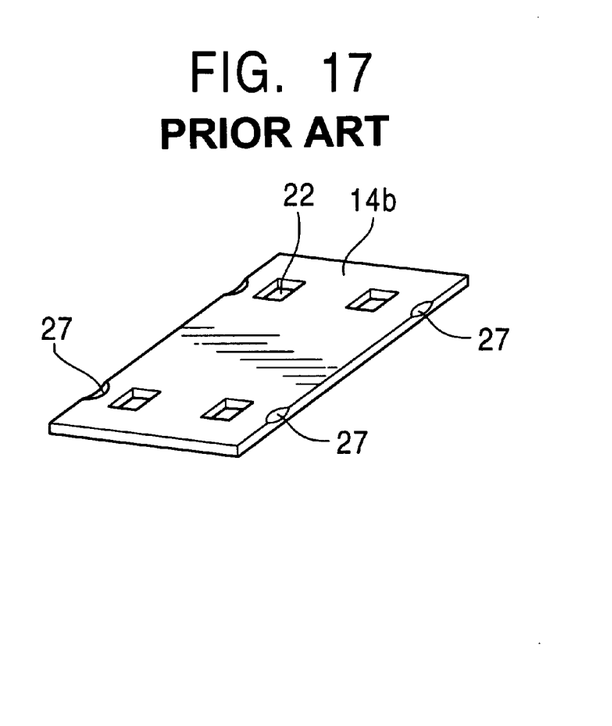
FIG. 17 is a rear perspective view of the joint member employed in the storage case of the third embodiment.

Accordingly, the joint member 14b may be, as shown in FIG. 17, provided with recesses 27, whose shape corresponds to the half of the arc of each protrusion 23, at both side ends thereof to be in contact with the protrusions 23. These recesses 27 allow the joint member 14b to be stably placed at the center of the bottom section 12a, which adds to the appearance of the storage case as a commodity.

Furthermore, when the joint member 14b is slid across the protrusions 23 for joining storage cases or for other purposes, the recesses 27 also serve as guides for the joint member 14b, which provides the operational advantage of facilitating the slide. Consequently, the recesses 27 are, of course, applicable to the joint members in the aforesaid first and second embodiments.

In any of the aforesaid embodiments, when the storage case is singly used, it is outwardly neat because the joint member is held on the bottom section thereof. When two storage cases are joined, the joint means, that is, the joint member 14, 14a, or 14b is slid out and inserted into a required position where it lies on both storage cases, which easily achieves a stable joint without much constraints to placement and the like.

As mentioned above, in a storage case according to the present invention, a joint means capable of being slid out is located on a bottom section of an outer body section, and it is hidden there when joining is not required. As a result, the storage case is outwardly neat and the appearance thereof is good. In addition, since there are no projections for use in joining, the storage case is prevented from being hit by an object or the hand.

Furthermore, the storage case can be, of course, singly used without any constraints to placement, and a plurality of storage cases can be arbitrarily and easily joined in the lateral direction via the joint means in order to respond to a gradual increase in the number of contents.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A storage case for storing a plurality of encased recording media, comprising:
   a boxlike outer body section; and
   an inner storage section capable of sliding into and out of said outer body section,
   wherein said outer body section has, at the bottom thereof, a retractable joining plate having a plurality of cavities therein, and engaging means to be engaged at least with said cavities in said joining plate for holding said joining plate in a single position, and
   said inner storage section has a space, having outer dimensions that approximate outer dimensions of said joining plate, for storing said joining plate.

2. A storage case according to claim 1, wherein said engaging means includes:
   a leg section, with which said joining plate is slidably engaged, and
   a plurality of protruding segments, each of which individually engages with one of said cavities in said joining plate.

3. A storage case according to claim 2, wherein said joining plate has a beveled edge for guiding said joining plate when sliding over said leg section.

4. A storage case according to claim 1, wherein said joining plate is formed of a flat plate member, and at least two of said cavities extend through said flat plate, each forming a window.

5. A storage case according to claim 1, wherein at least two of said cavities are disposed on opposite edges of said joint member.

6. A storage case for storing a plurality of encased recording media, comprising:
   a boxlike outer body section having an outer surface that includes a plurality of protruding segments disposed between a pair of guide rails;
   a retractable joint member that is supported by said plurality of guide rails, and has a plurality of cavities therein that individually engage with each of said protruding segments; and
   an inner storage section that has a space for storing said joint member, with outer dimensions that approximate outer dimensions of said joint member.

7. A storage case according to claim 6, wherein said guide rails limit movement of said joint member to a single axis.

8. A storage case according to claim 7, wherein said protruding segments prevent movement of said joint member along said single axis.

9. A storage case according to claim 6, wherein said joint member is a flat plate member, and at least two of said cavities extend through said flat plate, each forming a window.

10. A storage case according to claim 6, wherein said joint member has a beveled edge for guiding said joint member over said guide rails.

11. A storage case according to claim 6, wherein said inner storage section is capable of sliding into and out of said outer body section.

12. A storage case according to claim 6, wherein at least two of said cavities are disposed on opposite edges of said joint member.

13. A storage case according to claim 6, wherein said space for storing said joining plate is disposed below a shelf disposed inside said inner storage section.

* * * * *